United States Patent
Rea et al.

(10) Patent No.: US 10,472,185 B2
(45) Date of Patent: *Nov. 12, 2019

(54) MACHINE AND STATION FOR MAKING SINGLE-USE CAPSULES FOR BEVERAGES

(71) Applicant: IMA INDUSTRIES S.R.L., Ozzano Dell'Emilia (Bologna) (IT)

(72) Inventors: Dario Rea, Monterenzio (IT); Emanuele Rubbi, Castel Guelfo di Bologna (IT); Pierluigi Castellari, Castel San Pietro Terme (IT)

(73) Assignee: GIMA, S.P.A., Zola Predosa (IT)

( * ) Notice: Subject to any disclaimer, the term of this patent is extended or adjusted under 35 U.S.C. 154(b) by 740 days.

This patent is subject to a terminal disclaimer.

(21) Appl. No.: 14/377,742

(22) PCT Filed: Mar. 26, 2013

(86) PCT No.: PCT/IB2013/052391
§ 371 (c)(1),
(2) Date: Aug. 8, 2014

(87) PCT Pub. No.: WO2013/144835
PCT Pub. Date: Oct. 3, 2013

(65) Prior Publication Data
US 2015/0027085 A1    Jan. 29, 2015

(30) Foreign Application Priority Data

Mar. 29, 2012  (IT) .............................. BO2012A0169

(51) Int. Cl.
*B65G 47/00*        (2006.01)
*B65G 47/84*        (2006.01)
(Continued)

(52) U.S. Cl.
CPC .......... *B65G 47/848* (2013.01); *B65B 29/022* (2017.08); *B65B 43/44* (2013.01); *B65B 43/46* (2013.01)

(58) Field of Classification Search
CPC .......... B65B 29/02; B65G 47/84; B65G 43/44
(Continued)

(56) References Cited

U.S. PATENT DOCUMENTS 3,775,934 A * 12/1973 Smith ................... B65B 7/2814
                                                141/178
3,965,656 A *  6/1976 Gerben .................... B65B 3/32
                                                 53/282
(Continued)

FOREIGN PATENT DOCUMENTS

EP      0468079 A1    1/1992
EP      0974539 A1    1/2000
(Continued)

*Primary Examiner* — Chelsea E Stinson
(74) *Attorney, Agent, or Firm* — Pearne & Gordon LLP

(57) ABSTRACT

A beverage capsule machine for making single use capsules (1) for infusion beverages such as coffee, milk, chocolate, tea or combinations of these ingredients, comprises: a transport element (8) for transporting the components of the capsule (1) and being closed in a loop around movement means (9); the transport element (8) is configured to define a plurality of pockets (10) for receiving the components of the capsule (1) and which are positioned one after the other, in succession; a plurality of stations which are positioned along a path (P) followed by the transport element (8) and which are configured for operating continuously in phase with the same transport element (8) and comprising at least: a feed station (11) for feeding rigid containers (2) into respective pockets (10) of the transport element (8); a dosing station (12) for dosing the product into the rigid container
(Continued)

(2); a closing station (13) for closing the rigid container (2) with a length of sheet (7); an outfeed station (14) for the capsule (1).

18 Claims, 5 Drawing Sheets

(51) Int. Cl.
*B65B 43/44* (2006.01)
*B65B 43/46* (2006.01)
*B65B 29/02* (2006.01)

(58) Field of Classification Search
USPC .................................. 53/282, 266.1, 476
See application file for complete search history.

(56) References Cited

U.S. PATENT DOCUMENTS

| | | | | |
|---|---|---|---|---|
| 4,065,909 | A * | 1/1978 | Mueller | B65B 7/168 |
| | | | | 53/420 |
| 4,746,321 | A * | 5/1988 | Benedicenti | B65D 5/321 |
| | | | | 493/112 |
| 5,067,308 | A * | 11/1991 | Ward | B65B 43/44 |
| | | | | 221/223 |
| 5,385,526 | A * | 1/1995 | Sigrist | B31F 1/0029 |
| | | | | 493/123 |
| 6,206,169 | B1 * | 3/2001 | Spatafora | B65B 35/04 |
| | | | | 198/347.1 |
| 8,539,743 | B2 | 9/2013 | Rapparini et al. | |
| 9,708,134 | B2 * | 7/2017 | Rea | B65G 47/848 |
| 10,246,204 | B2 * | 4/2019 | Rea | B65B 1/46 |
| 2009/0193767 | A1* | 8/2009 | Poget | B65B 35/18 |
| | | | | 53/476 |
| 2011/0016834 | A1 | 1/2011 | Rapparini | |

FOREIGN PATENT DOCUMENTS

| | | |
|---|---|---|
| GB | 2438187 A | 11/2007 |
| WO | 2008129350 A1 | 10/2008 |
| WO | 2010007633 A1 | 1/2010 |

\* cited by examiner

MACHINE AND STATION FOR MAKING SINGLE-USE CAPSULES FOR BEVERAGES

TECHNICAL FIELD

This invention has for an object a beverage capsule machine for making single use capsules for extract or infusion beverages such as coffee, tea, milk, chocolate or combinations of these ingredients.

BACKGROUND ART

The above mentioned capsules, used in machines for making these beverages, comprise in their simplest form, the following:
- a rigid, cup-shaped container comprising a perforatable or perforated bottom and an upper aperture provided with a rim (and usually, but not necessarily, having the shape of a truncated cone);
- a dose of extract or infusion beverage product contained in the rigid container; and
- a length of sheet obtained from a web for sealing the aperture of the rigid container and designed (usually but not necessarily) to be perforated by a nozzle which supplies liquid under pressure.

Usually, but not necessarily, the sealing sheet is obtained from a web of flexible material.

In some cases, the capsules may comprise one or more rigid or flexible filtering elements.

For example, a first filter (if present) may be located on the bottom of the rigid container.

A second filter (if present) may be interposed between the length of sealing sheet and the product dose.

The capsule made up in this way is received and used in specific slots in machines for making beverages.

At present, capsules of this kind are made using machines which operate in "step by step" fashion. One known example of machines of this kind is described in patent publication WO 2010/007633.

The machine described in WO 2010/007633 comprises a conveyor belt which is closed in a loop around two power-driven horizontal-axis pulleys in such a way as to form an upper, active section and a lower, non-operative return section.

The belt comprises a series of successive pockets which receive the rigid containers fed by a corresponding station located above the active section of the belt.

As it moves stepwise along a feed direction, the active section of the belt positions each pocket with a respective rigid container in it under a series of stations for making up the capsule.

Basically, the station which feeds the rigid container is followed by at least one station for dosing the product into the rigid container, a station for closing the aperture of the rigid container with a length of film (for example by heat-sealing) and, lastly, a station for feeding out the capsules thus made.

It should be noted, however, that along the rectilinear, active section of the belt, there may be further, auxiliary stations, for example to check capsule weight and to form the length of film, filter application stations, means for removing rejects, and so on.

However, a single production line combined with step by step operation has proved to be low in productivity per unit time.

To overcome this problem, the belt was made wider in the direction transversal to the direction of belt motion so as to form two or more juxtaposed rows of pockets for receiving respective rigid containers.

This technical choice, however, meant augmenting the installed stations, like those mentioned above, placed side by side in a horizontal plane transversely to the direction of motion of the active section of the belt.

While this solution on the one hand partly increased the overall productivity of the machine per unit time, on the other it made the machine more cumbersome and decidedly more expensive and increased the risks of machine shutdowns owing to the large number of devices operating along the active section of the belt.

This structural choice does not therefore balance the overall costs with the results of operational productivity and does limit the operating speed of the machine.

AIM OF THE INVENTION

The aim of this invention is to provide a beverage capsule machine for making single use capsules for extract or infusion beverages such as coffee or tea and which overcomes the above mentioned disadvantages of the prior art.

More specifically, this invention has for an aim to provide a beverage capsule machine for making single use capsules for extract or infusion beverages such as coffee or tea and which is capable of guaranteeing high productivity per unit time, with high operating speeds and a reduced number of operating stations, and guaranteeing also a high level of dependability.

A further aim of the invention is to provide a beverage capsule machine for making single use capsules for extract or infusion beverages such as coffee or tea and which has a compact structure, is reduced in size and makes good quality products.

A further aim of the invention is to provide one or more operating stations capable of reaching high operating speeds, with production flexibility according to machine operating requirements, and with reduced dimensions along the operating path.

These aims are fully achieved, according to the invention, by the beverage capsule machine for making single use capsules for extract or infusion beverages and by the capsule component feed station as characterized in the appended claims.

More specifically, the beverage capsule machine for making single use capsules for extract or infusion beverages, such as coffee or tea, comprises: a transport element for transporting the capsule components and being closed in a loop around movement means for moving the transport element; the element is configured to define a plurality of pockets for receiving the capsule components and arranged one after the other in succession, each having a respective vertical axis; a plurality of stations which are positioned along a path followed by the transport element and which are configured for operating in phase with the transport element and which comprise: a feeding station for feeding rigid containers into respective pockets of the transport element; a dosing station for dosing an extract or infusion product into the rigid container; a closing station where the upper aperture of the rigid container is closed with a length of sheet; an outfeed station which withdraws from the transport element each capsule formed.

According to the invention, one or more of the aforementioned stations comprises: a picking point where capsule components placed on top of each other in a stack are picked up; at least one contact head for picking and detaching a component from the bottom of the stack at the picking point and placing the component on the transport element; movement means for moving the at least one contact head from a first, advanced position configured both to contact and pick the component and also to place the component on the transport element, to a second, withdrawn position when the contact head is in transit; a wheel designed to rotate the at least one contact head and the movement means and configured to operate in phase therewith and with the transport element and to carry the at least one contact head from the picking point to a transit zone of the transport element along a first movement path, and from the transport element to the picking point along a second movement path.

The invention also provides a feed station for supplying components of single-use capsules for extract or infusion beverages, such as coffee or tea, to a transport element which is closed in a loop around movement means for moving the transport element; the transport element being configured to define a plurality of pockets for receiving the capsule components and arranged one after the other in succession, each having a respective vertical axis. The station according to the invention comprises at least one picking point where capsule components placed on top of each other in a stack are picked up; at least one contact head for picking and detaching a component from the bottom of the stack at a picking point and placing the component on the transport element; movement means for moving the at least one contact head from a first, advanced position configured both to contact and pick the component and also to place the component on the transport element, to a second, withdrawn position when the contact head is in transit; at least one wheel designed to rotate the at least one contact head and the movement means and configured to operate in phase therewith and with the transport element and to carry the at least one contact head from the picking point to a transit zone of the transport element along a first movement path, and from the transport element to the picking point along a second movement path.

A machine equipped with a station of this kind is capable of feeding any capsule component both with continuous and step-by-step movement of the transport element, guaranteeing precision, dependability and flexibility. The structure of the station or stations thus obtained allows the attainment of high production speeds in reduced spaces.

Preferably, the wheel is keyed to a power-driven, horizontal axis shaft for moving the wheel continuously in phase with the transport element.

Preferably, both the wheel and the transport element move continuously and in phase with each other.

BRIEF DESCRIPTION OF THE DRAWINGS

These and other features of the invention will become more apparent from the following detailed description of a preferred, non-limiting embodiment of it, with reference to the accompanying drawings, in which.

DETAILED DESCRIPTION OF PREFERRED EMBODIMENTS OF THE INVENTION

With reference to the accompanying drawings, the machine according to this invention (denoted in its entirety by the numeral 100) is used to make single use capsules for extract or infusion beverages such as coffee, tea, milk, chocolate or combinations of these ingredients.

Figure 2:
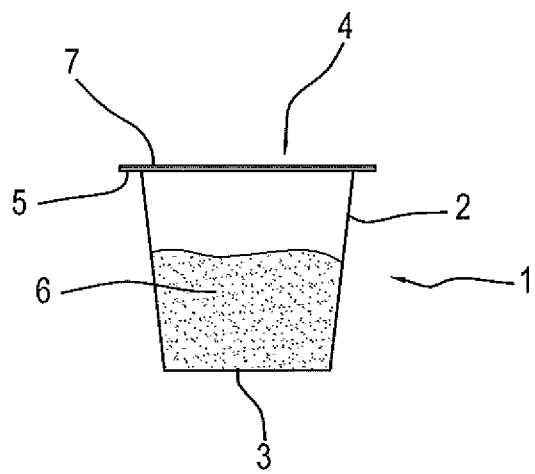
FIG. 2 is a schematic side view of an example of a single use capsule, made with the machine of FIG. 1, for extract or infusion beverages such as coffee, tea, milk, chocolate or combinations of these ingredients.

More specifically—see FIG. 2—single use beverage capsules 1 comprise, in a minimum, non-limiting configuration: a rigid, cup-shaped container 2 (usually in the shape of a truncated cone) comprising a bottom 3 and an upper aperture 4 provided with a rim 5; a dose 6 of product for extraction or infusion contained within the rigid container 2 and a length of sheet 7 for closing the upper aperture 4 of the rigid container 2, If the length of sheet 7 is to be perforated when the beverage is made, the length of sheet 7 forms a hermetic seal for the rigid container 2.

It should be noted that the length of sheet 7 is obtained from a flexible web, that is to say, a web of material having flexibility properties. Alternatively, the length of sheet 7 may be a rigid element.

It should also be noted that this type of capsule 1 may also comprise one or more filtering or product retaining elements (not illustrated here for simplicity reasons).

More specifically, a first filter may be located on the bottom of the rigid container in order to improve the beverage made or to retain product. The first filter may be a rigid filter. Alternatively, the first filter may be a flexible filter.

The capsule 1 may also comprise a second filter positioned between the length of sheet 7 and the product dose 6: in this case, the second filter allows improved (uniform) distribution of the liquid on the product.

Figure 1:
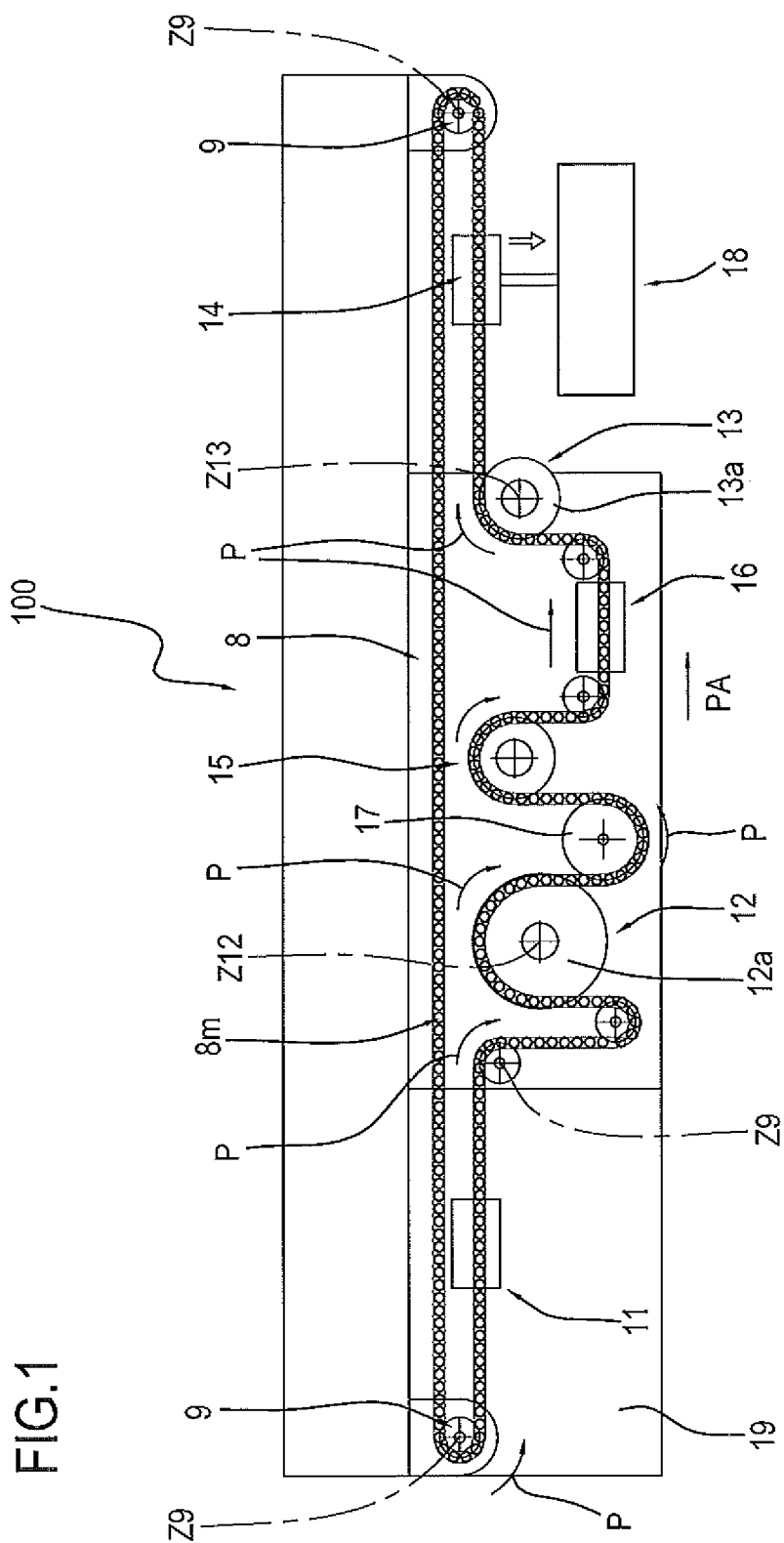
FIG. 1 is a schematic top plan view of a beverage capsule machine for making single use capsules for extract or infusion beverages such as coffee, tea, milk, chocolate or combinations of these ingredients.

The machine 100 (see FIG. 1) comprises a transport element 8 for transporting components of the capsule 1.

The transport element 8 is closed in a loop around movement means 9 which rotate about axes Z9 for moving the transport element 8.

Preferably, the movement means 9 rotate continuously. Preferably, the movement means 9 rotate about vertical axes Z9.

More preferably, the movement means 9 rotate continuously about vertical axes Z9 to allow the transport element 8 to move continuously.

Figure 3:
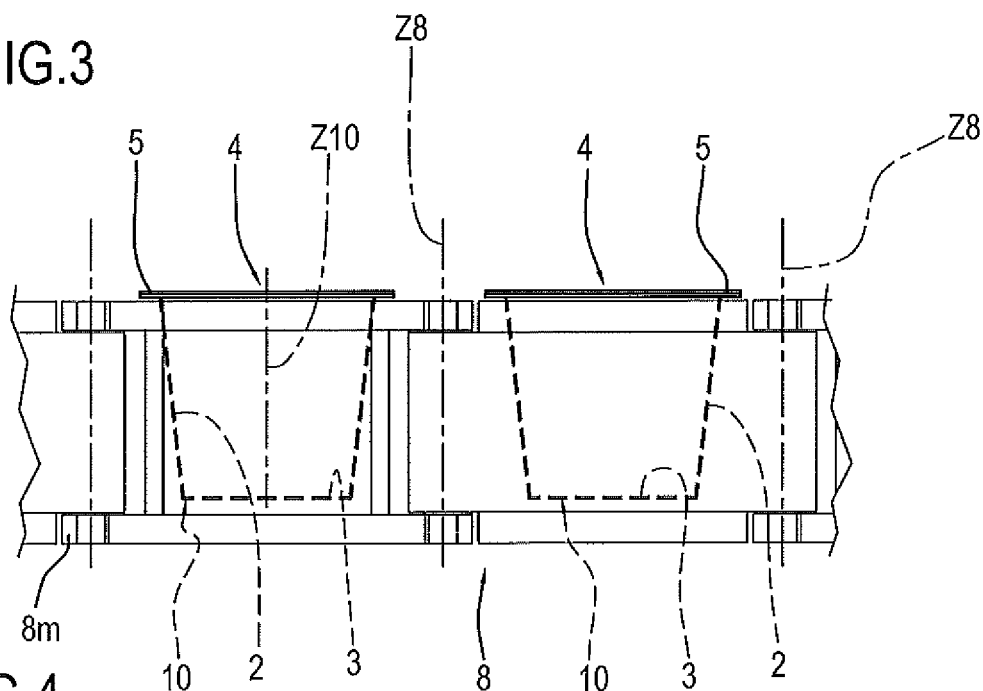
FIGS. 3 and 4 are a schematic side view and a schematic top plan view illustrating a part of a transport element for transporting a rigid container.
Figure 4:
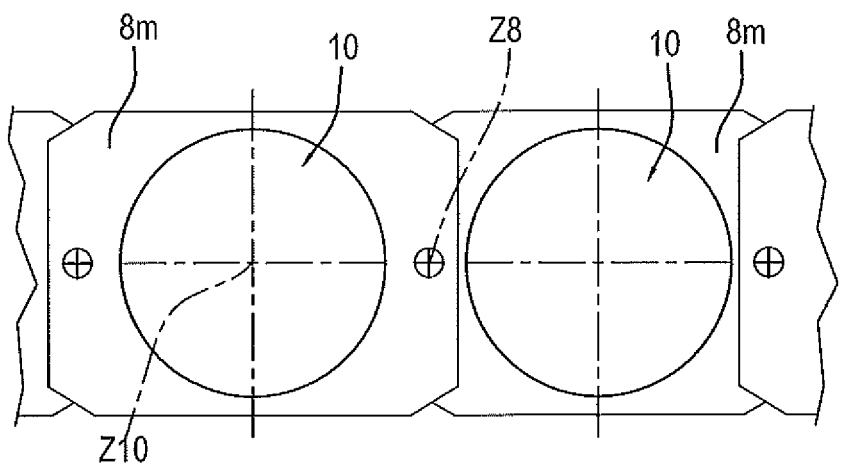

More specifically, the transport element 8 is configured to define a plurality of pockets 10 for receiving the rigid containers 2 and arranged one after the other in succession, not necessarily continuous, each having a respective vertical axis Z10 (see also FIGS. 3 and 4).

It should be noted that the machine 100 comprises a plurality of stations which are positioned along a path P followed by the transport element 8 and which are configured for operating in phase (also continuous) with the transport element 8 and comprising at least four basic stations.

A feeding station 11 feeds the rigid containers 2 into respective pockets 10 of the transport element 8.

A dosing station 12 doses the extract or infusion product into the rigid container 2.

A closing station 13 closes the aperture 4 of the rigid container 2 with the length of sheet 7.

An outfeed station 14 withdraws the capsule 1 formed from the transport element 8.

Preferably, the transport element 8 is a chain comprising a plurality of links 8*m*, hinged to one another in succession about corresponding vertical axes Z8. Preferably, the transport element 8 forms a continuous loop. It should be noted that at least one chain link 8*m* comprises at least one pocket 10, with a vertical axis Z10, for receiving a respective component (rigid container 2) positioned with the aperture 4 facing upward.

It should be noted that the chain 8 may comprise links 8*m*, each comprising a respective pocket 10 with a vertical axis Z10 for a respective component (rigid container 2), as well as connecting links which are not provided with pockets 10 and which are interposed between links 8*m* which are provided with pockets 10. In other words, the links 8*m* provided with pockets 10 might not be in continuous succession (this embodiment not being illustrated).

Preferably, each link 8*m* of the chain 8 comprises at least one pocket 10, with a vertical axis Z10, for receiving a respective component (rigid container 2) positioned with the aperture 4 facing upward.

It should be noted that a chain 8 made in this way forms a single row of components (rigid containers 2) moving continuously along a predetermined path P.

According to the invention (see FIG. 5), one or more of the stations 11, 12, 13, 14 comprises at least one picking point 20 for picking up components of the capsule 1 placed on top of each other in a stack 22 and a contact head 21 for picking a single component from the bottom of the stack 22. The contact head 21 is configured to pick and detach the component from the picking point 20 and to place the component on the transport element 8.

Also according to the invention, the station or stations comprise movement means 23 for moving the contact head 21 from a first, advanced position configured both to contact and pick the component and also to place the component on the transport element 8, to a second, withdrawn position when the contact head 21 is in transit.

Passing from the advanced position to the withdrawn position, the contact head 21 extracts the component from the stack 22. Passing from the withdrawn position to the advanced position, the contact head 21 places the component in a respective pocket 10 of the transport element 8.

Figure 5:
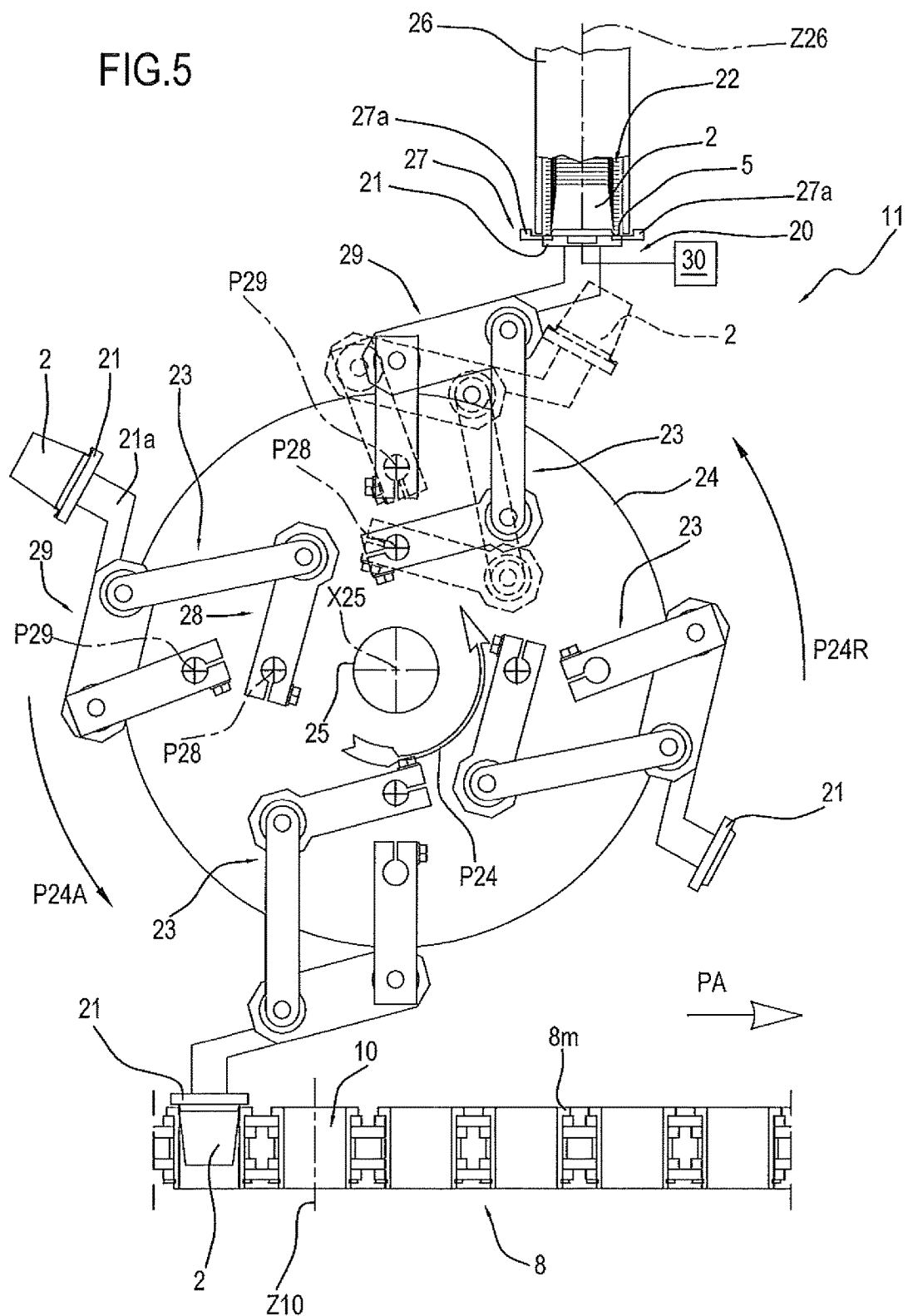
FIG. 5 is a schematic front view of a rigid container feed station according to the invention for the machine of FIG. 1.

Also according to the invention, the station or stations comprise at least one wheel 24 for rotating the contact head 21 and the movement means 23 and configured to operate in phase therewith and with the transport element 8 and to carry the contact head 21 from the picking point to a transit zone of the transport element 8 along a first movement path P24A, and from the transit zone of the transport element 8 to the picking point 20 along a second movement path P24R By way of example, FIG. 5 shows a feed station 11 by which the rigid containers 2 are fed and which is structured according to the invention, but the description is only an example because the same station architecture can be used as the dosing station (if ready packed, stacked product doses are used) or as the closing station (if stacked lengths of sheet 7 are used) or as a station for placing filtering or retaining elements (if present) inside the rigid container 2. The capsule components, therefore, may from time to time be the rigid containers 2, the product doses, or the filtering or retaining elements, if any.

Thus, a station structured in this way makes the machine 100 extremely flexible in assembly according to the production requirements of the capsules 1, thanks to the possibility of using one or more stations with this structure.

Further, the possibility of using this structure in stations of different types allows costs and dimensions to be reduced.

Preferably, the wheel 24 for rotating the contact head 21 and the movement means 23 is keyed to a power-driven shaft 25, with horizontal axis X25, for moving the wheel 24 continuously in phase with the transport element 8.

Preferably, the axis of rotation X25 of the power-driven shaft 25 is disposed transversely, preferably perpendicularly to the axis Z10 of the pockets 10 of the transport element 8.

Preferably, the axis of rotation X25 of the shaft 25 is transversal, preferably perpendicular to a feed direction of the transport element 8 at the feed station 11.

It should be noted that in the example illustrated, both the wheel 24 and the transport element 8 are movable continuously.

It should also be noted that the wheel 24 (in the example of FIG. 5) rotates in a direction P24 substantially concordant with a feed direction PA of the transport element 8.

Preferably, the picking point 20 is located at a fixed point along the circular path of the wheel 24.

It should be noted that the picking point 20 is located opposite a transit zone of the transport element 8.

Preferably, the picking point 20 comprises a magazine 26 for housing the stack 22 of components to be fed (in this case, again by way of an example, rigid containers 2 positioned with the aperture 4 facing down).

The magazine 26 has at least one open end portion for feeding the components to the contact head 21.

Advantageously, the open end portion of the magazine 26 has a longitudinal axis Z26 parallel to the vertical axes Z10 of the pockets 10 in the transport element 8 when the pockets are at the wheel 24.

In an embodiment not illustrated, the open end portion of the magazine 26 has a longitudinal axis Z26 which is not parallel to the vertical axes Z10 of the pockets 10 when the pockets are at the wheel 24, and makes with them an angle of between 0 and 90°, advantageously between 0 and 45° and preferably between 0 and 30°.

At the open end portion, the magazine 26 is equipped with means 27 for controlled retaining and detaching of the components. The means 27 are configured to release one component at a time, under the action of the contact head 21, and to hold back the next component.

In the embodiment illustrated, the means 27 comprise at least two flanges 27*a* located on the end portion of the magazine 26 and acting transversely to the axis Z26 of the selfsame magazine 26.

In a retaining position, the flanges 27*a* hold back the rim 5 of the lowermost rigid container 2 and then, in phase with the contact head 21, move away from each other in order to release the rigid container 2. Next, the flanges 27*a* return to the retaining position to hold back a rim 5 of the next rigid container 2 (thanks, for example, to elastic return members).

Preferably, the contact head 21 is equipped with suction means 30 for holding the component to be picked and moved.

The suction means 30 are represented schematically as blocks in one contact head 21 in FIG. 5. It will be understood that all the contact heads 21 may be equipped with suction means 30.

Preferably, the movement means 23 comprise a double pair of articulated arms 28 and 29 having a corresponding point of connection P28, P29 located on the wheel 24. Advantageously, the double pair of articulated arms 28, 29 defines a five-bar linkage.

The contact head 21 is associated (through an arm 21a, for example, L-shaped) with one of the arms of one pair (in this case, the one labelled 29).

The kinematic structure thus obtained gives the contact head 21 two degrees of freedom and allows it to adopt the aforementioned advanced and withdrawn positions while at same time allowing a movement to adapt the position of the contact head 21 according to the rotational movement of the wheel 24.

That way, the contact head 21 can, on the one hand, pick up the component with a movement along the longitudinal axis Z26 of the magazine 26 and, on the other, place the component on the transport element 8 in a correct position relative to the pocket 10 even in the presence of continuous movements of the wheel 24 relative to the transport element 8 (that is, with follower type component feed).

The movement of the pair of arms 28 and 29 may be obtained through the agency of cam profiles internal of the wheel and not illustrated here for simplicity reasons.

Figure 7:
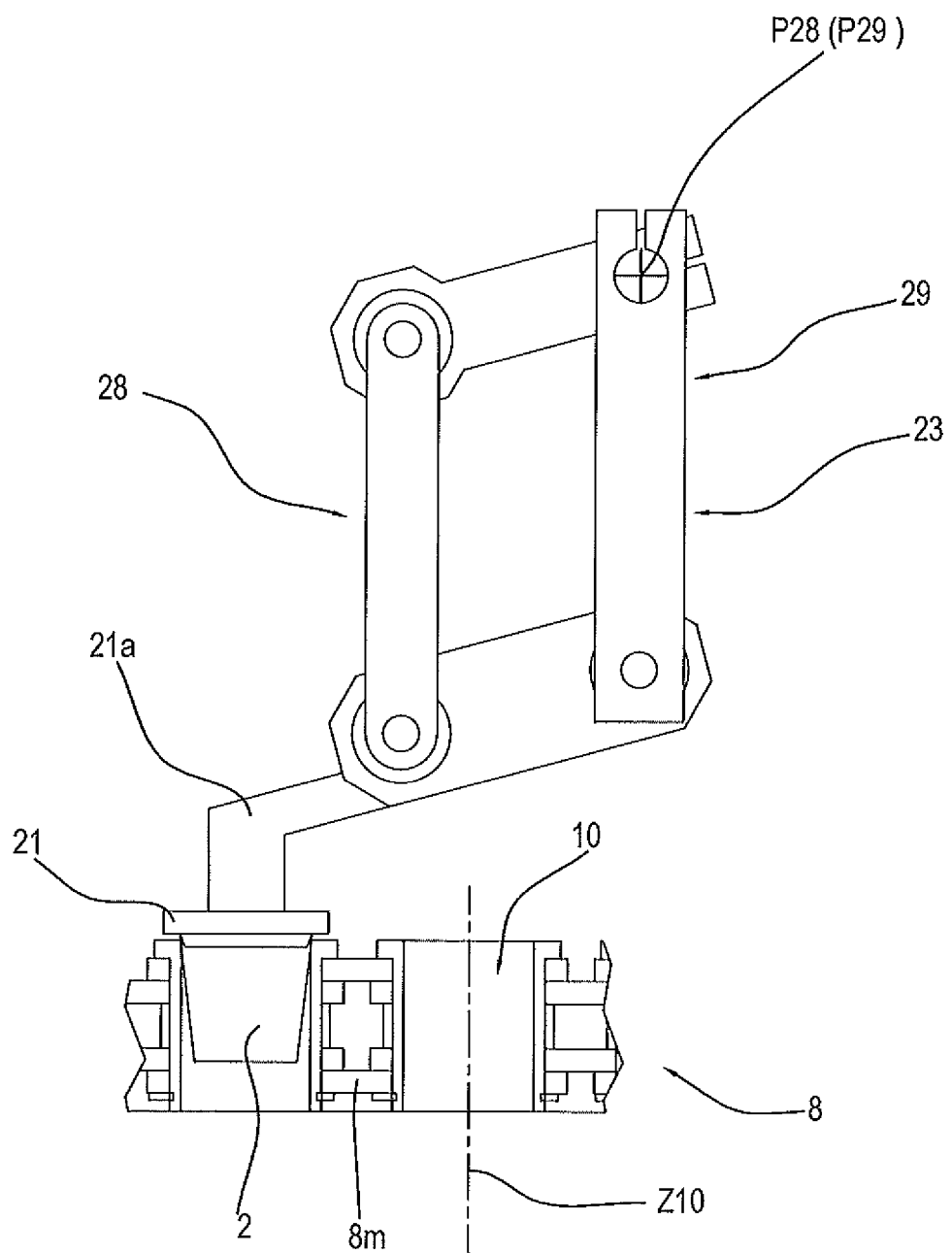
FIG. 7 shows a construction variant of movement means for moving a contact head forming part of the feed station of FIGS. 5 and 6.

In an alternative embodiment, illustrated in FIG. 7, the points of connection P28, P29 of the pairs 28 and 29 of articulated arms are superposed, on the movement wheel 24, that is to say, they are positioned along a common axis, parallel to the horizontal axis of rotation X25 of the wheel 24, even if the arms are moved independently of each other.

Preferably, the units made up of one contact head 21 and the respective movement means 23 may be greater than one in number and positioned circumferentially round the wheel 24, while maintaining a single picking point 20.

In the embodiment illustrated, there are four units on the wheel 24, positioned at 90° from each other. The number of units on the wheel 24 may vary as a function of the production speeds necessary to feed the components to the transport element 8.

It should be noted that during the course of one full rotation of the wheel 24, the contact head 21 is at an advanced, position when it picks a component from the magazine 26, at a withdrawn position when in transit towards the transport element 8, at the advanced position again when it places the component on the transport element 8 and, lastly, at a withdrawn position again when in transit from the transport element 8 towards the magazine 26 and waiting to pick another component.

Figure 6:
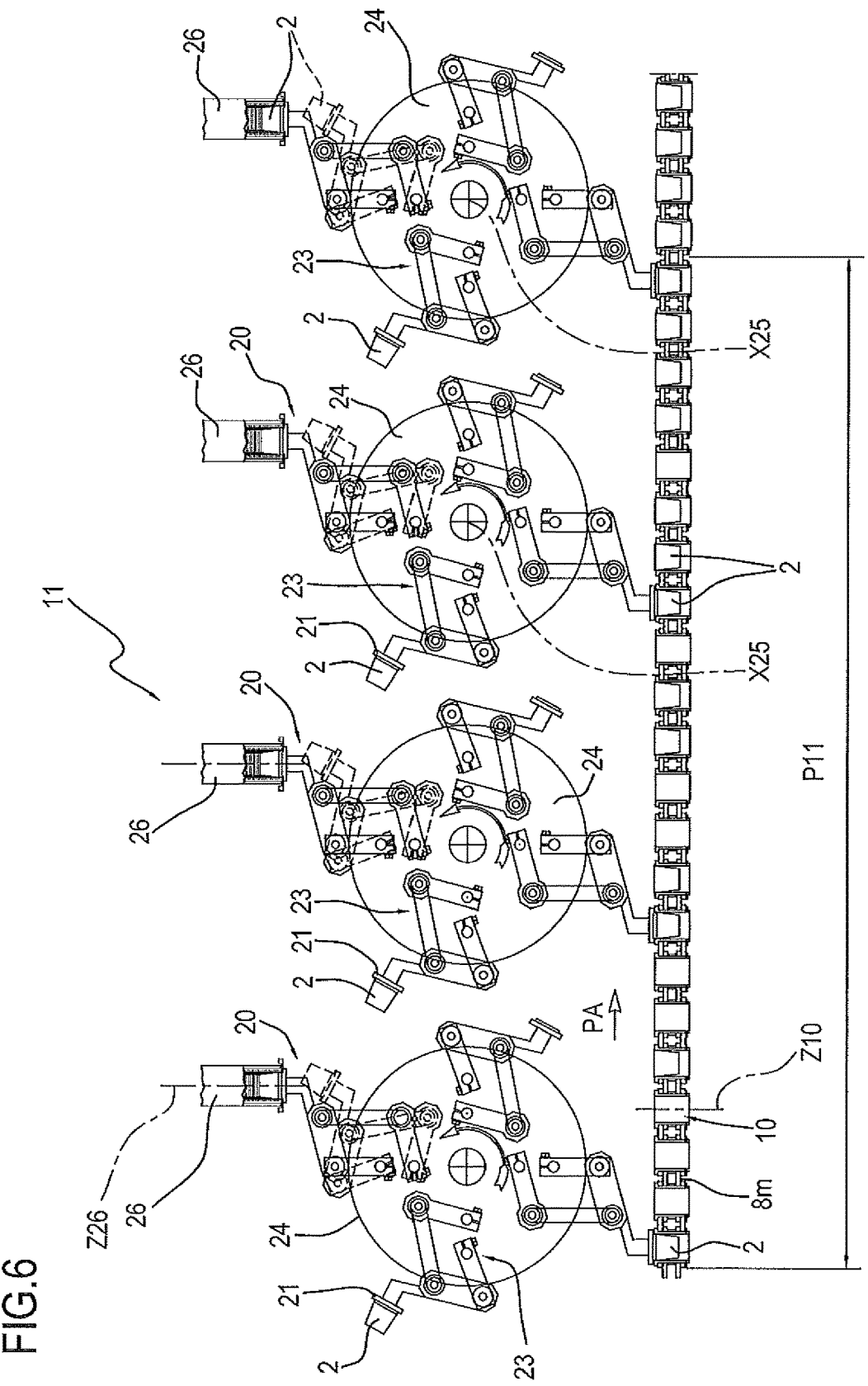
FIG. 6 shows a variant embodiment of the feed station of FIG. 5, again in a schematic front view.

FIG. 6 illustrates a preferred embodiment where the feed station 11 for feeding the rigid containers 2 comprises four wheels 24, mounted side by side along the path P of the transport element 8, and four respective single picking points 20.

Each wheel 24 comprises four units, each made up of one contact head 21 and the respective movement means 23.

Thanks to this type of structure, the transport element 8 is progressively supplied with rigid containers 2 in predetermined succession until all its pockets 10 in a reduced stretch of the path P are full, but with the possibility of a high transit speed.

The feed station 11 illustrated in FIG. 6 offers several advantages: thanks to the number of wheels 24, the number of units made up of contact heads 21 and the respective movement means 23 on each wheel, and the spacing between one pocket 10 and the next, the wheels 24 can be operated at a speed which imparts to the contact heads 21 a peripheral speed which is practically the same as the feed speed of the transport element 8; that way, the rigid containers 2 can be placed in the respective pockets 10 particularly easily without necessitating major adjustments by the movement means 23. In other words, in the embodiment illustrated in FIG. 6, each contact head 21 of each wheel 24 places capsules 1 in respective pockets 10 whose spacing is approximately equal to an arc between two successive contact heads 21.

Depending on the productivity required of the feed station 11, configurations of the feed station 11 with a different number of wheels 24 and contact heads 21 may provide advantages similar to those provided by the feed station 11 of FIG. 6.

In an embodiment not illustrated, the productivity of the machine can be further increased by increasing the number of units made up of contact heads 21 and movement means 23, by mounting two or more units side by side along directions parallel to the axis of rotation X25 of the shaft 25. As a result, there will be two or more picking points 20 located side by side along a direction parallel to the axis of rotation X25 of the shaft 25 and the transport element 8 will comprise links 8m with pockets 10 which are side by side transversely of the feed direction.

In a further embodiment not illustrated, two or more contact heads 21 mounted in a plane perpendicular to the axis of rotation X25 of the wheel 24 can be associated with a single arm of the movement means 23 to place two or more rigid containers 2 at a time in respective pockets 10. Advantageously, the arm 21a may be shaped to have two or more protuberances which carry the contact heads 21. Consequently, the feed station 11 will have two or more picking points 20 lying in a plane perpendicular to the axis of rotation X25 of the wheel 24.

Preferably, the machine 100 also comprises a cleaning station 17 for cleaning the rim 5 of the upper aperture 4 of the rigid container 2 and positioned downstream of the dosing station 12 with respect to a feed direction PA of the transport element 8.

Preferably, the cleaning station 17 is interposed between the dosing station 12 and a weighing station 15 (described below).

The cleaning station 17, too, is positioned along the path P and is configured to operate continuously, or step by step, and in phase with the transport element 8.

As mentioned above, the machine 100 comprises a weighing station 15 which weighs the rigid container 2 containing the product dose 6 and which is positioned along the path P of the transport element 8. It should be noted that the weighing station 15 is configured to operate continuously, or step by step, and in phase with the transport element 8.

Preferably, the weighing station 15 is interposed between the dosing station 12 (or, more specifically, the cleaning station 17) and the closing station 13.

Preferably, the machine 100 comprises a cutting station 16 where the length of sheet 7 is cut and placed on the aperture 4 of the rigid container 2.

The cutting station 16, too, is positioned along the path P of the transport element 8, is configured to operate continuously, or step by step, and in phase with the transport element 8 and is located upstream of the closing station 13 with respect to a feed direction PA of the transport element 8.

Preferably, the machine 100 comprises a stacking station 18 for stacking the capsules 1 and which is positioned close to the outfeed station 14.

It should be noted that the stacking station 18 is configured to receive the capsules 1 along a direction transversal to the path P followed by the transport element 8 at the outfeed station 14.

Preferably, the path P of the transport element 8 is also defined by a plurality of movement means 9, rotating about vertical axes Z9 and mounted (for example, keyed) to a supporting frame 19 extending in a horizontal plane; the movement means 9 may comprise transmission wheels.

It should be noted that the transmission wheels 19 are positioned along the frame to define an operative, non-linear portion of the path P (completed by the passage along or around the above mentioned operating stations), and a non-operative, rectilinear, return portion of the path P.

Thanks to the combination of the closed-loop chain and the constructional architecture of one or more stations according to the invention, the performance and productivity obtained are higher than those of similar machines of this kind currently available on the market.

The station according to the invention very flexibly allows adapting the number of units made up of contact head and respective movement means according to the operating requirements of the machine, while maintaining a high level of system safety and dependability.

Further, the machine structure and, more specifically, the continuously moving looped chain, creates a machine which is extremely compact but whose production capabilities are higher than those of machines which operate with step-by-step motion.

The flexibility of the chain setup makes it possible to install the essential and auxiliary stations according to requirements at suitable positions along the path and in such a way that the overall dimensions are reduced.

The flexibility of the chain setup also offers more opportunities to add alternative path stretches to allow making capsule variants (for example, including filtering elements).

The structure of the machine is therefore extremely flexible and allows high productivity levels to be attained, while maintaining good end product quality standards.

The invention claimed is:

1. A beverage capsule machine for making single use capsules (1) for extract or infusion beverages such as coffee or tea, comprising a rigid, cup-shaped container (2) having a bottom (3) and an upper aperture (4) provided with a rim (5), a dose (6) of extract or infusion product contained inside the rigid container (2) and a length of sheet (7) for closing the upper aperture (4) of the rigid container (2), the machine comprising: a transport element (8) for transporting the rigid containers (2) and being closed in a loop around first movement means (9) for moving the transport element (8); the transport element (8) being configured to define a plurality of pockets (10) for receiving the rigid containers (2) and which are positioned one after the other, in succession, each having a respective vertical axis (Z10); a plurality of stations which are positioned along a path (P) followed by the transport element (8) and which are configured for operating in phase with the transport element (8) and comprising: a feed station (11) for feeding the rigid containers (2) into respective pockets (10) of the transport element (8); a dosing station (12) for dosing the product into the rigid container (2); a closing station (13) where the upper aperture (4) of the rigid container (2) is closed with a length of sheet (7); an out feed station (14) which withdraws the capsules (1) from the transport element (8); characterized in that one or more of the stations (11, 12, 13, 14) comprises:
at least one picking point (20) where the rigid containers (2) placed on top of each other in a fixed stack (22) are picked up;
at least one contact head (21) for picking and detaching a rigid container (2) from the bottom of the fixed stack (22) at the picking point (20) and placing the rigid container (2) on the transport element (8);
a wheel (24) rotatable about an axis of rotation, the wheel (24) being effective to rotate the at least one contact head (21) around the axis of rotation of the wheel (24) and configured to operate in phase with the transport element (8) and to carry the at least one contact head (21) from the picking point (20) to a transit zone of the transport element (8) along a first movement path (P24A) around the axis of rotation of the wheel (24), and from the transit zone of the transport element (8) to the picking point (20) along a second movement path (P24R) around the axis of rotation of the wheel (24); and second movement means (23) arranged on and rotating with the wheel (24) and configured for moving the at least one contact head (21) from a pickup position in which the contact head (21) picks and detaches one of the rigid containers (2) from the bottom of the fixed stack (22) at the picking point (20) to a release position in which the contact head (21) places each rigid container (2) picked from the fixed stack into a corresponding pocket of the transport element, while the transport element moves, said corresponding pocket being provided with a recess for receiving from the contact head (21) the respective rigid container (2) positioned with the upper aperture facing upward, the rigid container (2) being effectively sized and dimensioned to receive the dose (6) of product therein, the upper aperture (4) of the rigid container (2) being sized and dimensioned to receive and be closed by the length of sheet (7);
wherein the contact head (21) is movable from a vicinity of the picking point (20) to a vicinity of the transit zone by rotation of the wheel (24), and wherein the second movement means (23) moves the contact head (21) between a first position and a second position, the first position being closer to the axis of rotation than the second position; the contact head (21) and the feeding station (11) being configured and dimensioned and shaped such that the contact head (21) can effectively pick and detach an empty rigid container (2) from the bottom of the fixed stack (22) at the picking point (20), carry the empty rigid container (2) along the first movement path (P24A) to the transit zone and place the empty rigid container (2) in a pocket (10) of the transport element (8); wherein the empty rigid container (2) is subsequently carried from the feeding station (11) to the dosing station (12) where the dose (6) is put into the rigid container (2), wherein the rigid container (2) is subsequently carried, after the feeding station (12) and after the dosing station (13), to the closing station (13) where the upper aperture (4) of the rigid container (2) is closed with the length of sheet (7).

2. The machine according to claim 1, wherein the transport element (8) is a chain comprising a plurality of links (8*m*) hinged to one another in succession about corresponding vertical axes (Z8).

3. The machine according to claim 1, wherein the wheel (24) is keyed to a power-driven shaft (25), with horizontal axis (X25) for moving the wheel (24) continuously in phase with the transport element (8).

4. The machine according to claim 1, wherein the first movement means (9) move the transport element (8) continuously and in phase with the wheel (24).

5. The machine according to claim 1, wherein the picking point (20) comprises a magazine (26) for housing the fixed stack (22) of rigid containers (2) to be fed.

6. The machine according to claim 5, wherein the magazine (26) has retaining and detaching means (27) configured to release one rigid container at a time, under the action of the contact head (21), and to hold back the next rigid container.

7. The machine according to claim 1, wherein the at least one contact head (21) is equipped with suction means (30) for holding the rigid container to be picked and moved.

8. The machine according to claim 1, wherein the second movement means (23) comprise at least one double pair of articulated arms (28, 29), each pair of articulated arms (28, 29) having a corresponding point of connection (P28, P29) located on the wheel (24); the contact head (21) being associated with one of the articulated arms of each pair of articulated arms (28, 29).

9. The machine according to claim 8, wherein the pairs of articulated arms (28, 29) of one double pair have points of connection (P28, P29) which are superposed on the wheel (24).

10. A feed station for supplying rigid, cup-shaped containers (2) of single-use capsules (1) for extract or infusion beverages such as coffee or tea, to a transport element (8); the transport element (8) being configured to define a plurality of pockets (10) for receiving the rigid containers (2) and which are positioned one after the other, in succession, each having a respective vertical axis (Z10);
characterized in that the feed station comprises:
at least one picking point (20) where the rigid containers (2) placed on top of each other in a fixed stack (22) are picked up;
at least one contact head (21) for picking and detaching a rigid container (2) from the bottom of the fixed stack (22) at the picking point (20) and placing the rigid container (2) on the transport element (8); and
movement means (23) arranged on and rotating with a wheel (24) which is rotatable about an axis of rotation and which is effective to rotate the at least one contact head (21) around the axis of rotation of the wheel (24), the movement means (23) being configured for moving the at least one contact head (21) from a pickup position in which the contact head (21) picks and detaches one of the rigid containers (2) from the bottom of the fixed stack (22) at the picking point (20) to a release position in which the contact head (21) places each rigid container (2) picked from the fixed stack into a corresponding pocket of the transport element, while the transport element moves, said corresponding pocket being provided with a recess for receiving from the contact head (21) the respective rigid container (2) positioned with an upper aperture facing upward;
wherein the contact head (21) is movable from a vicinity of the picking point (20) to a vicinity of a transit zone of the transport element (8) by rotation of the wheel (24), and wherein the movement means (23) moves the contact head (21) between a first position and a second position, the first position being closer to the axis of rotation than the second position; the contact head (21) and the feeding station (11) being configured and dimensioned and shaped such that the contact head (21) can effectively pick and detach an empty rigid container (2) from the bottom of the fixed stack (22) at the picking point (20), carry the empty rigid container (2) to the transit zone and place the empty rigid container (2) in a pocket (10) of the transport element (8), wherein each of the rigid containers (2) is effectively sized and dimensioned to receive a dose of extract or infusion product contained inside the rigid container (2).

11. The station according to claim 10, wherein the movement means (23) comprise at least one double pair of articulated arms (28, 29), each pair of articulated arms (28, 29) of one double pair having a corresponding point of connection (P28, P29) located on the wheel (24); the contact head (21) being associated with one of the arms of one pair (28, 29).

12. The station according to claim 11, wherein the pairs of articulated arms (28, 29) of one double pair have points of connection (P28, P29) which are superposed on the wheel (24).

13. The station according to claim 10, wherein the at least one contact head (21) is equipped with suction means (30) for holding the rigid container to be picked and moved.

14. The station according to claim 11, wherein the pairs of articulated arms (28, 29) of one double pair have points of connection (P28, P29) which are superposed on the wheel (24) and which are positioned along a common axis, parallel to the axis of rotation of the wheel (24).

15. A beverage capsule machine for making single use capsules (1) for extract or infusion beverages such as coffee or tea, comprising a rigid, cup-shaped container (2) having a bottom (3) and an upper aperture (4) provided with a rim (5), a dose (6) of extract or infusion product contained inside the rigid container (2) and a length of sheet (7) for closing the upper aperture (4) of the rigid container (2), the machine comprising: a transport element (8) for transporting the rigid containers (2) and being closed in a loop around first movement means (9) for moving the transport element (8); the transport element (8) being configured to define a plurality of pockets (10) for receiving the rigid containers (2) and which are positioned one after the other, in succession, each having a respective vertical axis (Z10); a plurality of stations which are positioned along a path (P) followed by the transport element (8) and which are configured for operating in phase with the transport element (8) and comprising: a feed station (11) for feeding the rigid containers (2) into respective pockets (10) of the transport element (8); a dosing station (12) for dosing the product into the rigid container (2); a closing station (13) where the upper aperture (4) of the rigid container (2) is closed with a length of sheet (7); an out feed station (14) which withdraws the capsules (1) from the transport element (8);
characterized in that one or more of the stations (11, 12, 13, 14) comprises:
at least one picking point (20) where the rigid containers (2) placed on top of each other in a fixed stack (22) are picked up;
at least one contact head (21) for picking and detaching a rigid container (2) from the bottom of the fixed stack (22) at the picking point (20) and placing the rigid container (2) on the transport element (8);
movement means (23) for moving the at least one contact head (21) from a first, advanced position configured both to contact and pick the rigid container (2) and also to place the rigid container (2) on the transport element (8), to a second, withdrawn position when the contact head (21) is in transit, wherein passing from the first, advanced position to the second, withdrawn position, the contact head (21) extracts the rigid container (2) from the stack (22), and wherein passing from the second, withdrawn position to the first, advanced position, the contact head (21) places the rigid container (2) in a respective pocket (10) of the transport element (8);

a wheel (24) having a power-driven shaft (25) for moving the wheel (24) continuously in phase with the transport element (8) and for rotating the at least one contact head (21) and the movement means (23), arranged on and rotating with the wheel (24), so as to carry the at least one contact head (21) from the picking point (20) to a transit zone of the transport element (8) along a first movement path (P24A), and from the transit zone of the transport element (8) to the picking point (20) along a second movement path (P24R) with a synchronised movement between the at least one contact head (21) and the transport element (8); wherein the wheel (24) is rotatable about an axis of rotation, the contact head (21) being arranged on the wheel (24) and movable by rotation of the wheel (24); the second, withdrawn position being closer to the axis of rotation than the first, advanced position; the wheel (24) being effective to rotate the at least one contact head (21) around the axis of rotation of the wheel (24); wherein each of the rigid containers (2) is effectively sized and dimensioned to receive a dose of extract or infusion product contained inside the rigid container (2); the upper aperture (4) of the rigid container (2) being sized and dimensioned to receive and be closed by the length of sheet (7); wherein the contact head (21) and the feeding station (11) are configured and dimensioned and shaped such that the contact head (21) can effectively pick and detach an empty rigid container (2) from the bottom of the fixed stack (22) at the picking point (20), carry the empty rigid container (2) along the first movement path (P24A) to the transit zone and place the empty rigid container (2) in a pocket (10) of the transport element (8).

16. The machine according to claim 8, wherein the pairs of articulated arms (28, 29) of one double pair have points of connection (P28, P29) which are superposed on the wheel (24) and which are positioned along a common axis, parallel to the axis of rotation of the wheel (24).

17. The machine according to claim 1, wherein the loop has a loop pathway which extends in a horizontal plane.

18. The machine according to claim 1, wherein the rigid containers (2) placed on top of each other at the picking point (20) are stacked upside down.

* * * * *